United States Patent Office 3,595,839
Patented July 27, 1971

3,595,839
CURABLE COMPOSITIONS OF IMPROVED VERSATILITY AND PROCESS OF PREPARING POLYUREAS
Kenneth B. Stokes, Minneapolis, Minn., assignor to General Mills, Inc.
No Drawing. Filed Feb. 5, 1969, Ser. No. 796,922
Int. Cl. C08g 22/02
U.S. Cl. 260—77.5                             21 Claims

ABSTRACT OF THE DISCLOSURE

Compositions capable of being cured under a wide variety of conditions comprising an organic polyisocyanate, a ketimine or aldimine blocked polyamine or isocyanate derivative thereof and an inorganic halide hydrate. Process of preparing polyureas from such compositions. The hydrate is of the formula:

$$M_p X_{mxp} \cdot n H_2 O$$

where M is the metal ion, X is the halide ion, M is the valence of the metal ion, $p$ is 1 or 2, and $n$ is 1 to 7.

---

The present invention relates to novel curable compositions and to the process of preparing polyurea polymers. More particularly, it relates to curable compositions comprising organic polyisocyanates, aldimine or ketimine blocked polyamines or derivatives thereof and inorganic halide hydrates. It also relates to the process of preparing polyurea polymers from such compositions.

It has recently been proposed to prepare polyurea polymers by reacting polyisocyanates with aldimine or ketimine blocked polyamines. A further inventive contribution has been the discovery that polyamines having the primary amine groups thereof converted to aldimine or ketimine groups and containing one or more secondary amine groups could be reacted with equivalent amounts of isocyanates (the equivalents being based on the isocyanato group or groups and the secondary amine group or groups) to provide novel derivatives having advantageous properties. These derivatives were found to be especially useful for reaction with polyisocyanates to form polyurea polymers. In order to prepare polyurea polymers of good properties from the described curable compositions, it has been heretofore necessary to add moisture to the same or expose the said compositions to atmospheres containing significant amounts of moisture. The moisture causes the aldimine or ketimine groups to revert to free primary amine groups and the free aldehyde or ketone. The primary amine groups are then able to react with the isocyanato groups of the polyisocyanate with formation of the polyurea polymer.

It is not always convenient to provide the needed quantities of moisture to unblock the primary amine groups. Thus where it is desired to accelerate the cure of the compositions by heating at elevated temperatures on production lines for instance, the heated atmosphere normally has a low humidity. Accordingly, the curing may not be accelerated at all unless a source of humidity, i.e. steam, is provided. Provision of steam adds equipment and an extra procedure and thus is not desired. This problem becomes more acute when vertical substrates are to be coated at elevated temperatures. The coatings have a tendency to sag and thus be unacceptable.

Plain water can be added to the ketimine or aldimine reactant. However, at high solids, such as when using a two component spray, the mixture with the polyisocyanate gells making the procedure impractical. In more dilute solutions, such as brush and one component spray applications, water reduces the pot life too much.

In addition to the above problems, it is also often desired to accelerate the cure of the compositions even under conditions wherein sufficient moisture is supplied or available. Here it is important that the means provided to accelerate the cure rate does not entirely reduce the pot life of the composition.

It is an object of the present invention to provide novel and versatile curable compositions. It is a further object to provide an improvement in the process of preparing polyureas from polyisocyanates and aldimine or ketimine blocked polyamines or derivatives thereof. These and other objects will become apparent from the following detailed description.

I have now discovered that inorganic halide hydrates can be used in combination with polyisocyanates and aldimine or ketimine blocked polyamines or derivatives thereof to yield highly versatile curable compositions. The said hydrates accelerate the cure of the compositions under a variety of conditions without excessively reducing the pot life. Additionally, they make it possible to produce polyurea polymers of good properties under low humidity conditions and at elevated temperatures.

The useable polyamines include those having at least two primary amine groups. Aliphatic polyamines are the preferred reactants for preparation of the aldimines and ketimines. The reaction of carbonyl compounds with the primary amine groups of the polyamines can be illustrated as follows:

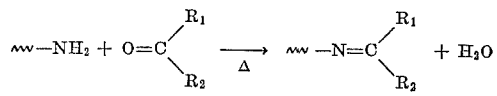

The useful carbonyl compounds may have the following structural formula

where $R_1$ and $R_2$ are hydrogen or organic radicals with the proviso that at least one of the same must be an organic radical. When organic, the radicals are preferably short chain alkyl groups (1 to 6 carbon atoms) or the phenyl group. Preferred carbonyl compounds are low molecular weight ($C_2$–$C_8$) aldehydes or ketones that are volatile so that an unreacted excess thereof may easily be removed by conventional distillation practices when the reaction is completed or as it proceeds. Such volatile compounds are also preferred so that when the blocked polyamine is mixed with the polyisocyanate reactant and the inorganic halide hydrate, the freed aldehyde or ketone is removed through its volatility from the reaction mixture.

Preferred examples of the carbonyl compounds include such aldehydes and ketones as acetone, methylethyl ketone, diethyl ketone, methylisopropyl ketone, methylisobutyl ketone, methyl-n-butyl ketone, methyl-tert-butyl ketone, ethylisopropyl ketone, acetaldehyde, benzaldehyde, propionaldehyde, butyraldehyde, isobutyraldehyde, and the like (i.e. including hexanone and hexanal). An especially preferred compound is

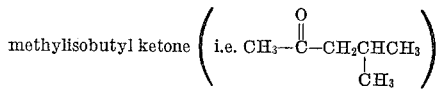

Preferred aliphatic polyamines are those having the structures:

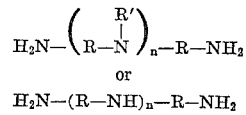

where R is a difunctional aliphatic group containing from 2–48 carbon atoms, R' is an aliphatic group containing 1–24 carbon atoms and $n$ is an integer of from 0–20. Representative R radicals are ethylene, propylene, trimethylene, butylene, pentylene, octylene, octadecylene, and the like. Representative R' radicals are methyl, propyl, butyl, decyl, hexadecyl, hexenyl, octenyl, tridecenyl, octadecyl, undecynyl and the like. Inert or non-interfering groups such as Cl, nitro and the like may be present on R and/or R'. Illustrative of the preferred compounds are the following alkylene polyamines: ethylene diamine, diethylene triamine, triethylene tetraamine, dipropylene triamine and mixed polyalkylene polyamines, such as N,N'-bis(gamma-aminopropyl)-ethylene diamine. Especially preferred compounds are those wherein R is a short chain alkylene group of 2 to 6 carbon atoms and $n$ is 2 or less.

While any of the aldimine or ketimine blocked polyamines as above described are useful, one of the preferred embodiments of the invention involves the use of certain derivatives of such blocked polyamines wherein the same contain one or more free secondary amine groups. Such derivatives are prepared from the polyamine compounds having at least one free secondary amine group and having the primary amine groups thereof blocked with ketimine or aldimine groups by reacting the same with equivalent amounts of organic isocyanates (the equivalents being based on the isocyanato group or groups and the secondary amine group or groups).

Typical polyisocyanates which may be used in preparing the derivatives useful in the present invention include the polymethylene diisocyanates such as ethylenediisocyanate, trimethylene diisocyanate, tetramethylenediisocyanate, pentamethylenediisocyanate, hexamethylenediisocyanate, etc.; other alkylene diisocyanates, such as propylene-1,2-diisocyanate butylene - 1,2 - diisocyanate, butylene-1,3-diisocyanate, butylene-2,3-diisocyanate, etc.; alkylidene diisocyanates, such as ethylidene diisocyanate, butylidene diisocyanate, etc.; cycloalkylene diisocyanates, such as cyclopentylene-1,3-diisocyanate, cyclohexylene-1, 4-diisocyanate, 4,4'-diisocyanate bis(cyclohexyl)methane, etc.; cycloalkylidene diisocyanates, such as cyclopentylidene, diisocyanate, cyclohexylidene diisocyanate, etc.; triisocyanates such as 1,2,4-butanetriisocyanate, 1,3,3-pentanetriisocyanate, 1,2,2-butanetriisocyanate, etc.

Examples of araliphatic polyisocyanates which may be used in preparing the derivatives include the following: p-phenylene 2,2'-bis(ethyl isocyanate), p-phenylene-3,3'-bis(propyl isocyanate), p-phenylene-4,4'-bis(butyl isocyanate), m-phenylene-2,2'-bis(ethyl isocyanate), 1,4-naphthalene-2,2'-bis(ethyl isocyanate), 4,4'-diphenylene-2,2'-bis(ethyl isocyanate), 4,4'-diphenylene ether-2,2'-bis (ethyl isocyanate), tris(2,2',2''-ethyl isocyanate benzene), 5-chloro phenylene-1,3-bis(propyl-3-isocyanate), 5-methoxy phenylene-1,3-bis(propyl-3 - isocyanate), 5 - cyano phenylene-1,3-bis(propyl-3 - isocyanate) and 5 - methyl phenylene-1,3-bis(propyl-3-isocyanate).

Typical aromatic polyisocyanates which may be used include tolylene diisocyanate, m-phenylene diisocyanate, p-phenylene diisocyanate, 1-methyl-2,4-phenylene diisocyanate, naphthylene-1,4-diisocyanate, diphenylene-4, 4'-diisocyanate, etc.; aliphatic-aromatic diisocyanate such as xylylene-1,4-diisocyanate, xylylene-1,3-diisocyanate, 4, 4'-diphenylenemethane diisocyanate, etc.

A particularly desirable group of polyisocyanates to be employed are derived from polymeric fat acids and have the following idealized structural formula:

$$[R''\{(CH_2)_yNCO\}_x$$

where $y$ is 0 or 1, $x$ is an integer of 2 to about 4 and R'' is the hydrocarbon group of polymeric fat acids. Preferably $x$ is 2. The polyisocyanates of the above formula wherein $y$ is 0 are prepared by converting the polymeric fat acids to the corresponding polymeric acid chlorides, reacting the acid chlorides with a metal azide to form the polymeric acyl azides and then heating the acyl azides to produce the polyisocyanates. This method of preparation can be conveniently illustrated by the following equations (using a dimeric fat acid as an example):

$$3D(COOH)_2 + 2PCl_3 \longrightarrow 3D(COCl)_2 + 2H_3PO_3$$
$$D(COCl)_2 + 2NaN_3 \longrightarrow D(CON_3)_2 + 2NaCl$$
$$D(CON_3)_2 \xrightarrow{\Delta} D(NCO)_2 + 2N_2$$

The polyisocyanates wherein $y$ is 1 are prepared by converting the polymeric fat acids to the corresponding polynitriles and then hydrogenating the polynitriles in the presence of ammonia and a catalyst such as Raney nickel to form polyamines.

The polyamines are then reacted with phosgene to give the polyisocyanates. This method of preparation can be conveniently illustrated by the following equations (using a dimeric fat acid as an example):

$$D(COOH)_2 + 2NH_3 \longrightarrow D(CN)_2 + 4H_2O$$
$$D(CN)_2 + 4H_2 \xrightarrow{NH_3} D(CH_2NH_2)_2$$
$$D(CH_2NH_2)_2 + COCl_2 \xrightarrow{catalyst} D(CH_2NCO)_2 + 2HCl$$

The polymeric fat acids, useful as the starting materials for preparing the above polyisocyanates, are prepared by polymerizing ethylenically unsaturated monobasic carboxylic acids having 16 to 22 carbon atoms or the lower alkyl esters thereof. The preferred aliphatic acids are the mono and polyolefinically unsaturated 18 carbon atom acids. Representative octadecenoic acids are 4-octadecenoic, 5-octadecenoic, 6-octadecenoic (petroselinic), 7-octadecenoic, 8-octadecenoic, cis-9-octadecenoic (oleic), trans-9-octadecenoic (elaidic), 11-octadecenoic (vaccenic), 12-octadecenoic and the like. Representative octadecadienoic acids are 9,12-octadecadienoic (linoleic), 9, 11-octadecadienoic, 10,12-octadecadienoic, 12,15-octadecadienoic and the like. Representative octadecatrienoic acids are 9,12,15-octadecatrienoic (linolenic), 6,9,12-octadecatrienoic, 9,11,13-octadecatrienoic (eleostearic), 10,12, 14-octadecatrienoic (pseudo eleostearic) and the like. A representative 18 carbon atom acid having more than three double bonds is moroctic acid which is indicated to be 4,8,12,15-octadecatetraienoic acid. Representative of the less preferred (not as readily available commercially) acids are: 7-hexadecenoic, 9-hexadecenoic (palmitoleic), 9-eicosenoic (gadoleic), 11-eicosenoic, 6,10,14-hexadecatrienoic (hiragonic), 4,8,12,16-eicosatetraenoic, 4,8,12, 15,18 - eicosapentanoic (timmodonic), 13 - docosenoic (erucic), 11-docosenoic (cetoleic), and the like.

The ethylenically unsaturated acids can be polymerized using known catalytic or non-catalytic polymerization techniques. With the use of heat alone, the mono-olefinic acids (or the esters thereof) are polymerized at a very slow rate while the polyolefinic acids (or the esters thereof) are polymerized at a reasonable rate. If the double bonds of the polyolefinic acids are in conjugated positions, the polymerization is more rapid than when they are in the non-conjugated positions. Clay catalysts are commonly used to accelerate the polymerization of the unsaturated acids. Lower temperatures are generally used when a catalyst is employed.

The polyisocyanate derived from these dimeric fat radicals and trimeric fat radicals may be referred to hereinafter by the names dimeryl isocyanate and trimeryl isocyanate. These materials may be produced from mixtures of dimer and trimer fat acid and the relative quantities may be controlled by the degree to which the individual compounds have been isolated in preparing the dimer and trimer fat acids.

Mono-isocyanates may also be employed in preparing the derivatives useful in the present invention. Such isocyanates may be aliphatic, cycloaliphatic, aromatic, araliphatic and the like. Representative of such isocyanates are the following: decylisocyanate, hexadecylisocyanate, heptadecylisocyanate, heneicosylisocyanate, octadecylisocyanate, docosylisocyanate, 18-pentatricontane isocyanate, naphthenic isocyanate derived from bicyclic naphthenic acid—i.e. $C_{20}H_{37}COOH$, 1-stearyl-oxyphenylene-4-isocyanate, 4-carbooctadecoxy tetrahydrophenyl isocyanate, n-dodecyl isocyanate, 9-octadecenyl isocyanate, cetyl isocyanate, cholesterol adipic acid ester isocyanate, octadecyl oxy acetic acid isocyanate, dodecyl mercaptan actic acid isocyanate, stearyl glycolic isocyanate, stearyl amino acetic acid isocyanate, urethane N-acetic acid isocyanate, hexadecyl oxy-phenyl isocyanate, octadecyl mercapto-propiono isocyanate, octadecyl mercapto-acetic acid isocyanate, lenulinic dioctadecyl mercaptol isocyanate, and the like.

Preferred organic isocyanates to be employed in preparing the derivatives are the isocyanates having hydrocarbon radicals. Between the mono and polyisocyanates, it is preferred to employ the latter. Particularly preferred compounds are the diisocyanates. Of this class the dimeryl diisocyanates are preferred reactants. Mixtures of the various organic isocyanates may be employed.

The derivatives are prepared by simply mixing the ketimine or aldimine blocked polyamine with the organic isocyanate. Such mixing is preferably carried out in a reaction environment substantially free of moisture. Where desired, the reaction mixture may be heated although the reaction is normally exothermic to a certain extent. The organic isocyanate is used in an amount about equivalent to the equivalents of free secondary amine groups of the polyamine. In this respect, if the polyamine contains one free secondary amine group and the isocyanate is a monoisocyanate, one mole of the polyamine is reacted with one mole of the isocyanate. If the polyamine contains two free secondary amine gorups and the isocyanate is a monoisocyanate, one mole of the polyamine would be reacted with two moles of the isocyanate. If the polyamine has one free secondary amine group and the isocyanate is a diisocyanate, two moles of the polyamine would be reacted with one mole of the diisocyanate. It is thus apparent that the ratio of reactants varies as to the number of free secondary amine groups of the polyamine—i.e. one, two, three or more—and as to whether the isocyanate is mono, di, tri or higher. The derivative may be prepared in the presence of a solvent or diluent if desired. The reaction of the secondary amine group or groups (i.e. >NH) of the polyamine with the isocyanate group (i.e. —NCO) yields a linkage of the following structure:

The derivatives are complex materials. In this respect they comprise a residue of a polyamine, 2 or more (preferably less than about 50) ketimine or aldimine blocked primary amine groups and 1 or more (preferably less than about 50) urea groups derived from the secondary amine group or groups of the polyamine and the isocyanate compounds. In some of the preferred and simpler aspects, the derivatives can be defined structurally. Thus when the polyamine has only one free secondary amine group and the isocyanate is mono- or di-functional or when the polyamine has more than one free secondary amine group and the isocyanate is monofunctional, the derivatives can de defined by the following idealized, structure formula:

(I) 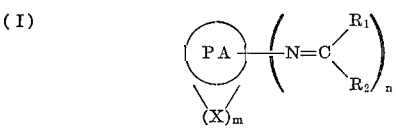

and (II) 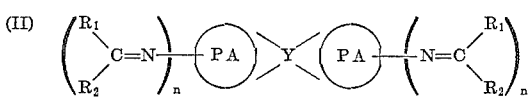

where $R_1$ and $R_2$ are as defined above, $n$ is an integer of at least 2, $m$ is an integer of at least 1,

is the residue of a polyamine exclusive of the ketimine or aldimine blocked primary amine groups and the urea linked secondary amine nitrogen or nitrogens,

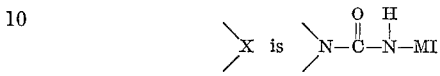

where MI is the residue of a monoisocyanate exclusive of the isocyanato group, and

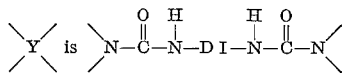

where DI is the residue of a diisocyanate exclusive of the isocyanato groups. Where the polyamine contains two or more secondary amine groups and the isocyanate is di, tri or higher functional, complex mixtures of derivatives tend to be produced. Such mixtures include compounds where two or more polyamine moieties are linked by two or more isocyanate moieties. The derivatives also include those prepared using two or more blocked polyamines and/or two or more different isocyanates.

Any organic polyisocyanate can be used in combination with the aldimine or ketimine blocked polyamines or the described derivatives thereof including those enumerated hereinabove with regard to the preparation of the said derivatives. Polyisocyanates containing hydrocarbon radicals are preferred and of these diisocyanates are particularly preferred. One especially preferred group of diisocyanates are those derived from dimeric fat acids as described hereinabove. Of course, mixtures of the various polyisocyanates can also be used.

The ratio of the aldimine or ketimine blocked polyamine or derivative thereof to the polyisocyanate can vary over relatively wide limits, it being only necessary that a sufficient amount of each reactant is present to yield a polyurea polymer. However, it is preferred that the equivalent ratio of polyisocyanate to polyamine reactant is in the range of about 1.5:1 to 1:1.5, the equivalents being based on the isocyanato groups and on the blocked primary amine groups plus any free secondary amine groups. It is especially preferred to use the reactants in approximately equivalent amounts.

The preferred inorganic halide hydrates can be represented by the following general formula:

$$M_pX_{mxp} \cdot nH_2O$$

where M is the metal ion, X is the halide ion, $m$ is the valence of the metal ion, $p$ is 1 or 2 and $n$ is from 1 to 7. Representative of the hydrates are the following: $AlCl_3 \cdot 6H_2O$, $AlF_3 \cdot H_2O$, $Al_2F_6 \cdot 7H_2O$, $AlI_3 \cdot 6H_2O$, $BaBr_2 \cdot 2H_2O$, $BaI_2 2H_2O$, $BaI_2 \cdot 6H_2O$, $Bi(NO_3)_2 \cdot 5H_2O$, $CaBr_2 \cdot 4H_2O$, $CaBr_2 \cdot 6H_2O$, $CaCl_2 \cdot H_2O$, $CaCl_2 \cdot 2H_2O$, $CaCl_2 \cdot 6H_2O$, $CaI_2 \cdot 6H_2O$, $CoCl_2 \cdot 6H_2O$, $CoI_2 \cdot 2H_2O$, $CoI_2 \cdot 6H_2O$, $CuCl_2 \cdot 2H_2O$, $FeBr_3 \cdot 6H_2O$, $FeCl_3 \cdot 6H_2O$, $FeF_3 \cdot 4\frac{1}{2}H_2O$, $FeCl_2 \cdot 4H_2O$, $FeI_2 \cdot 4H_2O$, $FeBr_2 \cdot 6H_2O$, $IrBr_3 \cdot 4H_2O$, $LiBr \cdot 2H_2O$, $MgBr_2 \cdot 6H_2O$, $MgCl_2 \cdot 6H_2O$, $MnBr_2 \cdot 4H_2O$, $MnCl_2 \cdot 4H_2O$, $MnI_2 \cdot 4H_2O$, $NiBr_2 \cdot 3H_2O$, $NiCl_2 \cdot 6H_2O$, $SnCl_4 \cdot 5H_2O$, $SnCl_2 \cdot 2H_2O$, $SrCl_2 \cdot 6H_2O$, $SrBr_2 \cdot 6H_2O$, $TlCl_3 \cdot 4H_2O$, $VF_3 \cdot 3H_2O$, $ZnF_2 \cdot 4H_2O$ and the like. The amount of the inorganic halide hydrate used can vary over wide limits as long as cure of the polyurea is accelerated. Preferably, the said hydrates are used in an amount of about 1 to 15% by weight based on the weight of polyisocyanate and polyamine reactants. Where the curing is to take place under low humidity, elevated temperature conditions, the said hydrates are preferably used in the upper area of the above preferred range. Some hydrates can be added to the combination of the polyisocyanate and the polyamine component a reasonable time prior to the use thereof as a coating material or the like.

It is preferred that the entire composition be maintained out of contact with moisture until the time of use or shortly before such time. The said hydrates are preferentially added to the polyamine reactant prior to the mixing of the same with the polyisocyanate to yield the versatile curable composition.

As indicated, the compositions of the present invention are valuable for the production of polyurea coatings on a variety of substrates including wood, metals such as steel and copper, and the like. They can be applied to such substrates using conventional procedures including brushing and spraying, and the like. Two component spray is preferred. In such procedure, the polyamine-hydrate combination is not mixed with the polyisocyanate until the two components blend in the spray gun. A diluent or solvent can optionally be included. Suitable organic solvents include dioxane, mineral spirits, xylene, tetrahydrofuran, toluene, naphtha, 2-nitropropane, etc. Where a solvent is used, it is preferred that the reactive components are present in amounts between about 10 to 90% by weight based on the entire composition.

Various fillers and pigments can be included in the compositions. Representative of such materials are amorphous silicas, titanium dioxide, carbon black, chrome yellow, phthalocyanine blue and green, toluidine red, quinacridone red, green, gold, toluidine yellow, iron oxide red and fire orange red. These materials are preferably added to the polyamine component prior to the preparation of the curable composition or to the curable composition shortly prior to its use.

Curing of the compositions according to the present invention is carried out by causing the aldimine or ketimine groups of the polyamine component to revert to the primary amine groups. Conversion of the said aldimine or ketimine groups to primary amine groups can be initiated by exposing the curable composition to atmospheric moisture, such as at ambient temperatures and at relative humidities of 15 to 100%. At higher temperatures, such as 250–450° F., the humidity may be low and the conversion can be initiated by the water of hydration of the inorganic halide hydrates. Accordingly, curing can be effected over a wide temperature range, preferably between about 75 to 450° F.

In the examples to follow, the dimeryl isocyanate employed has the formula $$OCN-CH_2-D-CH_2-NCO$$

where D is the divalent hydrocarbon radical of the dimerized fat acids obtained by polymerizing and hydrogenating (in the presence of palladium catalyst) the mixture of the fat acids derived from tall oil (composed of approximately 40–45% linoleic and 50–55% oleic, such percents being by weight). The ketimine blocked polyamine reactant is a derivative of the formula:

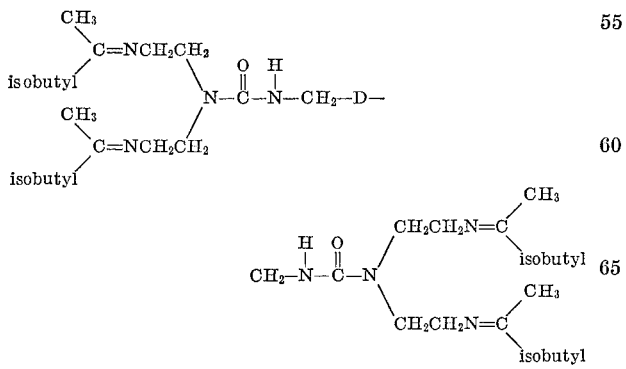

where D is as defined above. Such derivative was prepared by reacting the dimeryl isocyanate with an equivalent amount of the diketimine of diethylene triamine and methylisobutyl ketone.

The examples illustrate certain preferred aspects of the invention without limiting the same thereto.

EXAMPLE I

A base solution was prepared from 120 gm. (0.4 eq.) dimeryl isocyanate, 113.6 gm. (0.4 eq.) ketimine blocked polyamine derivative and 96 gm. dioxane. Ten percent by weight dispersions of ferric chloride hexahydrate and stannic chloride pentahydrate in dioxane were also prepared. In a first test series 0.25 gm. of the dispersions were each added to 20.6 gm. portions of the base solution with mixing. The mixtures were placed in polyethylene tubes, capped and immersed in a 70° C. water bath. A control of the base solution was also placed in a polyethylene tube which was then capped and immersed in the water bath. The mixing, capping and immersing were completed in approximately one minute, the completion of same being considered as 0 time. The reaction mixtures were then observed and the time of gelation noted. This gel time without water represents pot life. A second series of tests was carried out as above except that 0.25 gm. of water was added to each mixture including the control. The gel time of these compositions with water present represents the cure rate. The results are set forth in the following Table I.

TABLE I

| Mixture | Gel time (min.) | |
|---|---|---|
| | Without water | With water |
| Control | 142 | 4½ |
| Base solution plus— | | |
| Ferric chloride hexahydrate | 120 | 1 |
| Stannic chloride pentahydrate | 109 | ½–1 |

The above data show that the inorganic halide hydrates significantly increase the cure rate while yielding compositions have pot lives within 75% of the control. The above results were confirmed using compositions of essentially the same make-up as cast films at 72° F. and 50% relative humidity. The tack free time of the control was 75 minutes whereas the ferric chloride hexahydrate and stannic chloride pentahydrate containing compositions yielded films which were tack free in 45 minutes. The pot life of the control and the hydrate containing compositions was comparable as shown by Gardner-Holdt viscosity measurements on the compositions in covered glass jars. The viscosity of the control increased from H to U in two hours while the stannic chloride pentahydrate containing composition gave readings of 0 and W+ and the ferric chloride hexahydrate containing composition gave readings of M and W.

EXAMPLE II

A base solution was prepared from 15.2 gm. dimeryl isocyanate, 12.4 gm. ketimine blocked polyamine derivative and 11.8 gm. xylene. To one portion of the base solution was added 2.3% by weight of a 50% dispersion of stannic chloride pentahydrate in methyl isobutyl ketone. Such mixture along with a control were cast as films on steel panels which panels were placed on a hot plate and held at a temperature of 120° F. while steam was passed over the same (relative humidity was over 100%). Under these conditions, the control film became dust free in six minutes but was not tack free after 22 minutes. The film from stannic chloride pentahydrate containing composition had a dust free time of ½ minute and a tack free time of three minutes. Both coatings had a high gloss. Pot life of the compositions was of the same order as the compositions of Example I.

EXAMPLE III

Pigmented compositions were prepared by mixing 47.9 gm. ketimine blocked polyamine derivative, 470 gm. TiO$_2$, 84 gm. silica (Silver Bond B), 0.25 gm. Statex B-12 (medium color furnace black), 116 gm. xylene and 15.15 gm. isocyanate component. In the first composition the isocyanate component was dimeryl isocyanate per se. In the second composition the isocyanate component was a portion of a mixture of 302 gm. dimeryl isocyanate and 15 gm. of a 50% by weight stannic chloride pentahydrate solution in methylisobutyl ketone. Films were cast from these two pigmented compositions and exposed at 78° F. and 22% relative humidity. The film prepared from the composition containing the stannic chloride pentahydrate was tack free in 20 minutes whereas the film from the control composition required four hours to cure tack free.

EXAMPLE IV

A base composition was prepared from dimeryl isocyanate and the ketimine blocked polyamine derivative. Approximately 30 gm. portions of this composition (ratio of 14.4 gm. derivative and 15.85 gm. isocyanate) were used to coat steel panels (coating thickness about 3 mils). The portions were either (1) used per se, (2) diluted with xylene to 70% by weight active concentration, (3) mixed with 1.8 gm. of a 38.5% calcium chloride hexahydrate solution in absolute ethanol or (4) both diluted with the xylene and mixed with the calcium chloride hexahydrate solution at the levels indicated. The panels were then exposed to different atmospheres and the tack free time or sag noted. The results are set forth in the following Table II:

TABLE II

| Composition | Tack free time | | Sag, 260° F.[2] |
|---|---|---|---|
| | 14% relative humidity, 78° F. | Desiccator, 78° F.[1] | |
| (1) Control | >2 hours | >24 hours | Severe. |
| (2) Diluted with xylene | do | do | Do. |
| (3) Mixed with CaCl$_2$6H$_2$O | 15 min | 15 min | None. |
| (4) Diluted with xylene and mixed with CaCl$_2$6H$_2$O. | 20 min | 20 min | Do. |

[1] Relative humidity near zero.
[2] Panels held in vertical position, relative humidity near zero.

The above data show that the compositions of the present invention cure reasonably rapidly under varying conditions. The elimination of sag at elevated temperatures is particularly valuable.

It is to be understood that the invention is not to be limited to the exact details of operation or the exact compositions shown or described, as obvious modifications and equivalents will be apparent to those skilled in the art and the invention is to be limited only by the scope of the appended claims.

The embodiments of the invention in which an exclusive property or privilege is claimed are defined as follows:

1. In a composition capable of being cured to a polyurea polymer comprising an organic polyisocyanate and a polyamine reactant selected from ketimine and aldimine blocked polyamines and organic isocyanate derivatives of such blocked polyamines, the improvement consisting of including an inorganic halide hydrate in the composition in an amount sufficient to accelerate the cure of the composition, said inorganic halide hydrate having the formula $$M_pX_{mxp} \cdot nH_2O$$

where M is the metal ion, X is the halide ion, $m$ is the valence of the metal ion, $p$ is 1 or 2 and $n$ is 1 to 7.

2. The composition of claim 1 wherein the polyamine has the formula $$H_2N-(R-NH)_n-R-NH_2$$

where R is a difunctional aliphatic group containing from 2 to 48 carbon atoms and $n$ is an integer of 0 to 20 and the carbonyl compound used to block the primary amine groups of the polyamine has the formula

where $R_1$ and $R_2$ are hydrogen or organic radicals with the proviso that at least one of $R_1$ and $R_2$ must be an organic radical.

3. The composition of claim 2 wherein $n$ is 0 to 2, R is an alkylene group of 2 to 6 carbon atoms and $R_1$ and $R_2$ are hydrogen or alkyl groups of 1 to 6 carbon atoms with the proviso that one of $R_1$ and $R_2$ must be an alkyl group.

4. The composition of claim 1 wherein the polyamine reactant is an organic isocyanate derivative of a ketimine or aldimine blocked polyamine having at least one secondary amine group, such derivative having been prepared by reacting substantially equivalent amounts of the organic isocyanate and the ketimine or aldimine blocked polyamine, such equivalent amounts being based on the isocyanato and the secondary amine groups.

5. The composition of claim 4 wherein the derivative has the formula

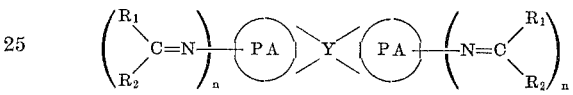

where $n$ is an integer of at least 2, $R_1$ and $R_2$ are hydrogen or alkyl groups of 1 to 6 carbon atoms with the proviso that at least one of $R_1$ and $R_2$ is an alkyl group,

is the residue of a polyamine exclusive of the ketimine or aldimine blocked primary amines groups and the urea linked secondary amine nitrogen or nitrogens and >Y< is

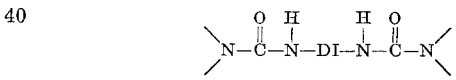

where DI is the residue of an organic diisocyanate exclusive of the isocyanato groups.

6. The composition of claim 1 wherein the organic polyisocyanate and the polyamine reactant are present in the equivalent ratio of 1.5:1 to 1:1.5, the equivalents being based on the isocyanato groups and on the blocked primary amine groups plus any free secondary amine groups.

7. The composition of claim 1 wherein the inorganic halide hydrate is present in an amount of about 1.0 to 15.0% by weight based on the weight of the organic polyisocyanate and the polyamine reactant.

8. The composition of claim 1 which also includes a solvent, the organic polyisocyanate and polyamine reactant being present in the solvent in a total amount of about 10 to 90% by weight based on the weight of the entire composition.

9. The composition of claim 1 wherein the organic polyisocyanate has the formula

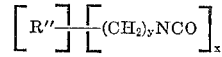

where $y$ is 0 or 1, $x$ is an integer of 2 to about 4 and R″ is the hydrocarbon group of polymeric fat acids prepared by polymerizing ethylenically unsaturated monobasic carboxylic acids having 16 to 22 carbon atoms.

10. The composition of claim 1 wherein the organic polyisocyanate has the formula $$OCN-CH_2-D-CH_2-NCO$$

and the polyamine reactant is a derivative having the formula

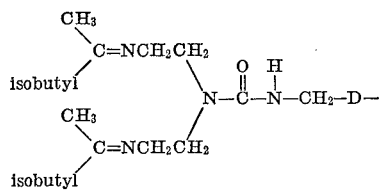

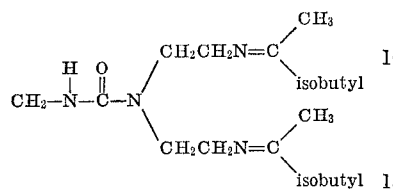

where D is the divalent hydrocarbon radical of the dimerized fat acids obtained by polymerizing the mixture of fat acids derived from tall oil composed of approximately 40–45% by weight linoleic acid and 50–55% by weight of oleic acid, the diisocyanate and derivative are present in an equivalent ratio of 1.5:1 to 1:1.5, the equivalents being based on the NCO and

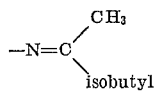

groups, the inorganic halide hydrate is calcium chloride hexahydrate and is present in an amount of about 1.0 to 5.0% by weight based on the weight of the diisocyanate and the derivative.

11. In the process of preparing a polyurea polymer wherein an organic polyisocyanate is reacted with a polyamine reactant selected from ketimine and aldimine blocked polyamines and organic isocyanate derivatives of such blocked polyamines, such reaction being carried out in an environment capable of causing the aldimine and ketimine groups of the polyamine reactant to revert to free primary amine groups, the improvement comprising carrying out the reaction in the presence of an inorganic halide hydrate in an amount sufficient to accelerate the reaction of the polyisocyanate and the polyamine reactant, said inorganic halide hydrate having the formula $$M_pX_{mxp} \cdot nH_2O$$

where M is the metal ion, X is the halide ion, $m$ is the valence of the metal ion, $p$ is 1 or 2 and $n$ is 1 to 7.

12. The process of claim 11 wherein the polyamine reactant has the formula

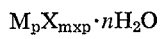

where R is a difunctional aliphatic group containing from 2 to 48 carbon atoms, $n$ is an integer of 0 to 20 and $R_1$ and $R_2$ are hydrogen or organic radicals with the proviso that one of $R_1$ and $R_2$ must be an organic radical.

13. The process of claim 12 where $n$ is 0 to 2, R is an alkylene group of 2 to 6 carbon atoms and $R_1$ and $R_2$ are hydrogen or alkyl groups of 1 to 6 carbon atoms with the proviso that one of $R_1$ and $R_2$ must be an alkyl group.

14. The process of claim 11 wherein the polyamine reactant is an organic isocyanate derivative of a ketimine or aldimine blocked polyamine having at least one secondary amine group, such derivative having been prepared by reacting substantially equivalent amounts of the organic isocyanate and the ketimine or aldimine blocked polyamine, such equivalent amounts being based on the isocyanato and the secondary amine groups.

15. The process of claim 14 wherein the derivative has the formula

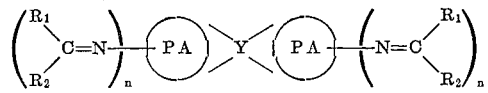

where $n$ is an integer of at least 2, $R_1$ and $R_2$ are hydrogen or alkyl groups of 1 to 6 carbon atoms with the proviso that at least one of $R_1$ and $R_2$ is an alkyl group,

is the residue of a polyamine exclusive of the ketimine or aldimine blocked primary amine groups and the urea linked secondary amine nitrogen or nitrogens and $>Y<$ is

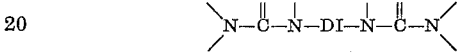

where DI is the residue of an organic diisocyanate exclusive of the isocyanato groups.

16. The process of claim 11 wherein the organic polyisocyanate and the polyamine reactant are used in the equivalent ratio of 1.5:1 to 1:1.5, the equivalents being based on the isocyanato groups and on the blocked primary amine groups plus any free secondary amine groups.

17. The process of claim 11 wherein the inorganic halide hydrate is present in an amount of about 1.0 to 15.0% by weight based on the weight of the organic polyisocyanate and the polyamine reactant.

18. The process of claim 11 wherein a solvent is used, the organic polyisocyanate and polyamine reactant being present in the solvent in a total amount of about 10 to 90% by weight based on the weight of the entire composition.

19. The process of claim 11 wherein the organic polyisocyanate has the formula

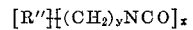

where $y$ is 0 or 1, $x$ is an integer of 2 to about 4 and R" is the hydrocarbon group of polymeric fat acids prepared by polymerizing ethylenically unsaturated monobasic carboxylic acids having 16 to 22 carbon atoms.

20. The process of claim 11 wherein the reaction is carried out at about 75 to 450° F. in the presence of atmospheric moisture.

21. The process of claim 11 wherein the organic polyisocyanate has the formula $$OCN-CH_2-D-CH_2-NCO$$

and the polyamine reactant is a derivative having the formula

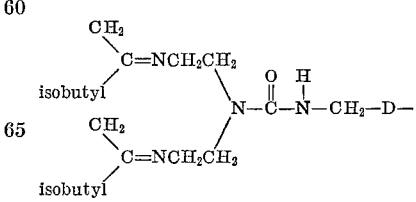

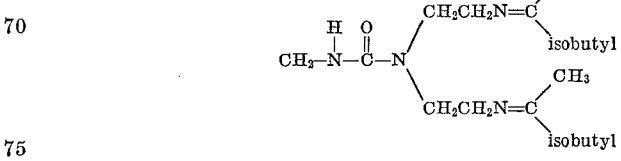

where D is the divalent hydrocarbon radical of the dimerized fat acids obtained by polymerizing the mixture of fat acids derived from tall oil composed of approximately 40–45% by weight linoleic acid and 50–55% by weight oleic acid, the diisocyanate and derivative are used in an equivalent ratio of 1.5:1 to 1:1.5, the equivalents being based on the NCO and

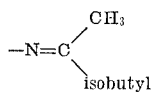

groups, the inorganic halide hydrate is calcium chloride hexahydrate and is used in an amount of about 1.0 to 5.0% by weight based on the weight of the diisocyanate and the derivative.

References Cited

UNITED STATES PATENTS

| | | | |
|---|---|---|---|
| 3,468,830 | 9/1969 | Kiss | 260—47X |
| 3,438,929 | 4/1969 | Appel | 260—77.5X |
| 3,426,097 | 2/1969 | Ilkka | 260—47X |
| 3,420,800 | 6/1969 | Haggis | 260—77.5X |
| 3,401,146 | 6/1968 | Kamal | 260—47 |
| 3,397,178 | 8/1968 | Shackelford | 260—47 |
| 3,378,600 | 4/1968 | Hodges | 260—47X |
| 3,337,606 | 8/1967 | Floyd | 260—47X |
| 3,256,213 | 6/1966 | Gmitter | 260—2.5 |
| 3,136,731 | 6/1964 | Piechota | 260—75X |
| 3,119,792 | 6/1964 | Schultheis | 260—2.5X |

DONALD E. CZAJA, Examiner

C. W. IVY, Assistant Examiner

U.S. Cl. X.R.

260—32.8, 33.2, 33.4, 33.6, 37